United States Patent
Huang et al.

(10) Patent No.: US 10,377,679 B2
(45) Date of Patent: Aug. 13, 2019

(54) KITCHEN WASTE TREATMENT DEVICE

(71) Applicant: ENVIRONMENTAL PROTECTION SCIENCE AND TECHNOLOGY CO. LTD., XIFU, GUANGDONG, Guangzhou (CN)

(72) Inventors: Zongcai Huang, Guangzhou (CN); Taiping Zhang, Guangzhou (CN); Huageng Hu, Guangzhou (CN); Nengwu Zhu, Guangzhou (CN); Xinghong Jin, Guangzhou (CN); Jian Wang, Guangzhou (CN); Tingting Yang, Guangzhou (CN); Yi Liu, Guangzhou (CN); Manying Chen, Guangzhou (CN)

(73) Assignee: ENVIRONMENTAL PROTECTION SCIENCE AND TECHNOLOGY CO. LTD., XIFU, GUANGDONG, Guangzhou (CN)

( * ) Notice: Subject to any disclaimer, the term of this patent is extended or adjusted under 35 U.S.C. 154(b) by 290 days.

(21) Appl. No.: 15/204,273

(22) Filed: Jul. 7, 2016

(65) Prior Publication Data
US 2017/0008816 A1    Jan. 12, 2017

(30) Foreign Application Priority Data
Jul. 8, 2015    (CN) .......................... 2015 1 0401722

(51) Int. Cl.
*C05F 17/00*    (2006.01)
*C05F 17/02*    (2006.01)
*C05F 9/02*    (2006.01)

(52) U.S. Cl.
CPC ............ *C05F 17/0205* (2013.01); *C05F 9/02* (2013.01); *C05F 17/027* (2013.01);
(Continued)

(58) Field of Classification Search
CPC ... C05F 17/0223; C05F 17/027; C12M 27/10; C12M 27/20
See application file for complete search history.

(56) References Cited

U.S. PATENT DOCUMENTS 2,924,513 A * 2/1960 Altimier .................. B01J 19/28
                                                    34/135
3,930,799 A * 1/1976 Eweson ................ B02C 17/007
                                                   435/290.3

FOREIGN PATENT DOCUMENTS

CN    101491809 A    7/2009
CN    203448380 U    2/2014
(Continued)

OTHER PUBLICATIONS

English language machine translation of DE2944519, pp. 1-11 (accessed May 14, 2018). (Year: 2018).*
(Continued)

*Primary Examiner* — William H. Beisner
(74) *Attorney, Agent, or Firm* — Ballard Spahr LLP

(57) ABSTRACT

A kitchen waste treatment device in environment-protection-device field comprises a main fermentation barrel comprising a barrel body mounted on supporting brackets and including a feed inlet, a discharge outlet and a material chamber, push plates located within the material chamber to push materials therein to move along barrel body axial direction and further a gas inlet system having gas inlets located at same barrel body end as the discharge outlet and a gas-exhaust system having gas-exhaust ports located at same barrel body end as the feed inlet; a feeding apparatus whose feed end communicates with the feed inlet; and a power apparatus driving the barrel body to rotate around its axis. The gas inlets/gas-exhaust ports communicate with the material chamber. The treatment device has simple compact structure and small occupied area and realizes material (Continued)

horizontal propulsion and repeated rotational-stirring in the barrel body by barrel body rotation, achieving material-degrading-and-fermenting object.

12 Claims, 3 Drawing Sheets

(52) U.S. Cl.
CPC ......... *C05F 17/0258* (2013.01); *Y02P 20/145* (2015.11); *Y02W 30/43* (2015.05)

(56) References Cited

FOREIGN PATENT DOCUMENTS

| | | | | |
|---|---|---|---|---|
| CN | 104907322 | A | 9/2015 | |
| CN | 204974685 | U | 1/2016 | |
| DE | 2944519 | A1 * | 5/1980 | ............... C05F 9/02 |
| JP | 06157177 | A * | 6/1994 | |

OTHER PUBLICATIONS

English language machine translation of JP06157177, pp. 1-5 (accessed May 14, 2018). (Year: 2018).*

First Office Action dated 2016 by the State Intellectual Property Office of the People's Republic of China for Patent Application No. 201510401722, which was filed on Jul. 8, 2015 and published as CN 104907322 on Sep. 16, 2015 (Inventor—Huang et al.; Applicant—Guangdong Xifu Environmental Protection Technol. Co., Ltd.) (Original—5 pages // Translation—6 pages).

Second Office Action dated 2017 by the State Intellectual Property Office of the People's Republic of China for Patent Application No. 201510401722, which was filed on Jul. 8, 2015 and published as CN 104907322 on Sep. 16, 2015 (Inventor—Huang et al.; Applicant—Guangdong Xifu Environmental Protection Technol. Co., Ltd.) (Original—4 pages // Translation—4 pages).

Notification to Grant Patent Right for Invention dated 2017 by the State Intellectual Property Office of the People's Republic of China for Patent Application No. 201510401722, which was filed on Jul. 8, 2015 and published as CN 104907322 on Sep. 16, 2015 (Inventor—Huang et al.; Applicant—Guangdong Xifu Environmental Protection Technol. Co., Ltd.) (Original—1 page // Translation—2 pages).

* cited by examiner

KITCHEN WASTE TREATMENT DEVICE

CROSS-REFERENCE TO RELATED APPLICATION

This application is a U.S. Non-provisional application, which claims priority to Chinese Patent Application No. 201510401722.2, filed Jul. 8, 2015, which is hereby incorporated by reference in its entirety.

TECHNICAL FIELD

The present invention relates to the field of environment protection devices, and particularly to a kitchen waste treatment device.

BACKGROUND ART

In people's daily life, restaurants produce a lot of household wastes every day, wherein the main waste includes remaining foods which are rich in organics, and if not treated well, are easy to rot in air, distributing bad smell bad and polluting air and environment. Hence, it is very necessary to perform treatment on the remaining foods and other household wastes. In the prior art, the kitchen wastes are treated mainly by fermentation, that is to say, after undergoing pretreatments such as draining, smashing and dehydration, the prior restaurant wastes are poured into a barrel equipped with an electric heating and stirring rod, then subjected to heating, stirring and drying treatments, kept in the heating barrel for a period of time, then taken out and packaged by a packing bag, and then fermented for decomposition (maturing).

The inventors have found in researches that there are at least the following defects in the treatment of restaurant wastes in the prior art:

firstly, the prior fermentation barrel is provided therein with a heating apparatus, achieves a fermentation process mainly by roasting kitchen wastes with the heating apparatus, and has a high energy consumption of about 600 kWh/ton;

secondly, the prior technology does not comprise an entire composting process, and relies on a high temperature to heat and dry, wherein partial kitchen wastes are carbonized, resulting in very low organic fertilizer content, low fertilizer efficiency and a side effect on the growth of plants, which is not convenient for popularization and application;

thirdly, kitchen waste fermentation devices are mainly mounted in densely populated residential areas which have high requirements for environment protection, however, the prior art fermentation barrels produce a large amount of waste gases during fermentation, and these waste gases greatly pollute the surrounding environment, in particular the air, which is strongly complained and opposed by residents, often resulting in work cannot be normally carried out;

fourthly, the prior art fermentation barrel is required to be provided therein with a stirring device, thus the fermentation barrel has a large volume and occupies a large area, which results in increased cost; and fifthly, the prior art fermentation barrel has a complicated structure and high production cost and is not convenient for maintenance and installation.

DISCLOSURE OF THE INVENTION

An object of the present invention is to provide a kitchen waste treatment device to improve the problems of high energy consumption, low fertilizer efficiency of products obtained after treatment and environmental pollution caused by a large amount of waste gases generated during device operation of the prior kitchen waste treatment device.

The present invention is carried out as follows:

In view of the object mentioned above, the present invention provides a kitchen waste treatment device comprising a main fermentation barrel, a feeding apparatus, a power apparatus, and supporting brackets, wherein the main fermentation barrel comprises a barrel body, wherein the barrel body is mounted on the supporting brackets, the barrel body includes a feed inlet, a discharge outlet and a material chamber, the feed inlet and the discharge outlet communicate with the material chamber, respectively, and a feed end of the feeding apparatus communicates with the feed inlet; and the power apparatus is connected to the barrel body in a driving way to drive the barrel body to rotate around its axis;

the main fermentation barrel further comprises a plurality of push plates, wherein the plurality of push plates are located within the material chamber and fixedly connected to the barrel body, the plurality of push plates are spaced with a set distance, and when the barrel body rotates, the push plates push materials in the material chamber to move along an axial direction of the barrel body;

the main fermentation barrel further comprises a gas inlet system and a gas exhaust system, wherein gas inlets of the gas inlet system and the discharge outlet are located at a same end of the barrel body, and the gas inlets communicate with the material chamber; and gas exhaust ports of the gas exhaust system and the feed inlet are located at a same end of the barrel body, and the gas exhaust ports communicate with the material chamber.

Preferably, the main fermentation barrel comprises a first end cover, the first end cover is mounted to cover a barrel opening of the barrel body, and both the gas exhaust ports of the gas exhaust system and the feed inlet of the barrel body are located on the first end cover.

Preferably, the gas exhaust system comprises a plurality of gas exhaust ports, and the plurality of gas exhaust ports are provided uniformly along a circumferential surface of the first end cover; and the gas exhaust port comprises a gas exhaust channel and a switch controlling opening or closing of the gas exhaust channel, wherein the gas exhaust channel is provided on the first end cover, the switch is connected to the gas exhaust channel in manner of rotation on a rotation axis, the rotation axis extends along the axial direction of the barrel body, and the switch rotates around the rotation axis, switching between an open state and a closed state.

Preferably, the feeding apparatus comprises a feed bin, a feed cylinder, a motor and a push rod, wherein the feed bin communicates with the feed cylinder, the feed cylinder is rotationally connected with the first end cover, and an axis of the feed cylinder is collinear with the axis around which the barrel body rotates; the push rod is provided thereon with a conveying plate, the conveying plate extends spirally along an axial direction of the push rod, and the conveying plate is located within the feed cylinder; and an output end of the motor is connected to the push rod in a driving way, and the feed end is located at an end of the feed cylinder.

Preferably, the feeding apparatus further comprises a supporting plate and a supporting holder, wherein the supporting plate is fixedly connected with the feed cylinder and the motor is mounted on the supporting plate; and the supporting holder is located between the motor and the feed cylinder, the supporting holder is mounted on the supporting plate, and the push rod penetrates through the supporting holder and is rotationally connected to the supporting holder.

Preferably, the material chamber comprises an inoculation and heating segment, a main fermentation segment, and a decomposition segment provided sequentially along a direction from the feed inlet to the discharge outlet;

the push plates comprises a plurality of spiral propulsion operating plates, a plurality of stirring operating plates, a plurality of turning operating plates and a plurality of material guide plates, wherein the plurality of spiral propulsion operating plates are located at an end of the barrel body, where the feed inlet is located, and configured to push the materials to the inoculation and heating segment;

the plurality of stirring operating plates are located at the inoculation and heating segment and configured to stir the materials and push the materials to the main fermentation segment;

the plurality of turning operating plates are located at the main fermentation segment and configured to turn the materials and convey the materials to the decomposition segment; and the plurality of material guide plates are located at the decomposition segment and configured to push the materials to the discharge outlet.

Preferably, the stirring operating plates comprise first stirring operating plates and second stirring operating plates, wherein the first stirring operating plates are located between the spiral propulsion operating plates and the second stirring operating plates, directions in which the first stirring operating plates and the second stirring operating plates are inclined are opposite, and the second stirring operating plates are configured to push the materials along a direction from the discharge outlet to the feed inlet.

Preferably, the power apparatus comprises an electric motor and a gear transmission assembly, wherein the gear transmission assembly includes a drive gear and a driven gear engaging each other, an output shaft of the electric motor is connected to the drive gear in a driving way, and the driven gear is sheathed on an external wall of the barrel body and fixedly connected to the barrel body.

Preferably, the main fermentation barrel further comprises a second end cover, wherein the gas inlets of the gas inlet system are located on the second end cover; and the gas inlet system comprises a plurality of gas inlets, wherein the plurality of gas inlets are distributed uniformly along a circumferential direction of the second end cover, the plurality of gas inlets are in communication through gas inlet tubes, and the gas inlet tubes communicate with a gas inlet end of a blower.

Preferably, the supporting bracket comprises a base and a supporting ring, wherein the supporting ring is sheathed on an external wall of the barrel body and fixedly connected to the barrel body; and the supporting ring and the base are connected by a roller therebetween.

Advantageous effects of the present invention are:

To sum up, the kitchen waste treatment device provided by the present invention carries out horizontal propulsion and repeated rotational stirring of the materials in the barrel body by rotation of the barrel body itself, to achieve the purpose of material degrading and fermenting. Specifically, the barrel body is provided therein with push plates which are fixed in the barrel body at set angles, the barrel body is driven by the power apparatus to rotate around its own axis, and the barrel body drives rotation of the push plates during rotation; and when the push plates rotate, since there are certain angles between plate surfaces of the push plates and a central line of the barrel body, the push plates can push the materials from the feed inlet to the discharge outlet, and while being pushed, the materials rotate together with the barrel body, so that contact between the materials and oxygen gas is more uniform and the degradation of the materials is more complete. Moreover, it is necessary to introduce a lot of oxygen gas during the degradation of the materials, and the gas inlets of the fermentation barrel are provided at an end of the barrel body where the discharge outlet is located, and after introduction, the gas comes into direct contact with the materials for main fermentation, so that biological bacteria multiply explosively, a large number of biological bacteria degrade the materials quickly into various organic ingredients, generating heat and water. The generated heat further increases the temperature in the main fermentation phase, and at the same time, with the introduction of the gas from the gas inlets, the heat also enters the feed inlet along with the gas to heat and wet new materials fed from the feed inlet so as to promote growth of bacteria and provide a better condition for the main fermentation phase. Further, the gas exhaust ports are provided at an end of the barrel body where the feed inlet is located, facilitating collecting waste gases generated during the fermentation and avoiding air pollution due to leakage of the waste gases, so as not to affect people's life.

In a word, the kitchen waste treatment device of the present invention has a simple and reasonable structure, low energy consumption, and high degradation efficiency and excellent degradation effect of organic substances during the fermentation of kitchen wastes, realizes high fertilizer efficiency, and is suitable for large-scale popularization.

BRIEF DESCRIPTION OF DRAWINGS

Drawings required for use in the examples will be introduced briefly below in order to explain the technical solutions of the examples of the present invention more clearly. It should be understood that the drawings below are merely illustrative of some examples of the present invention and are therefore not to be considered limiting of the scope, and those skilled in the art also can obtain, from these drawings, other relevant drawings without inventive efforts.

Figure 1:
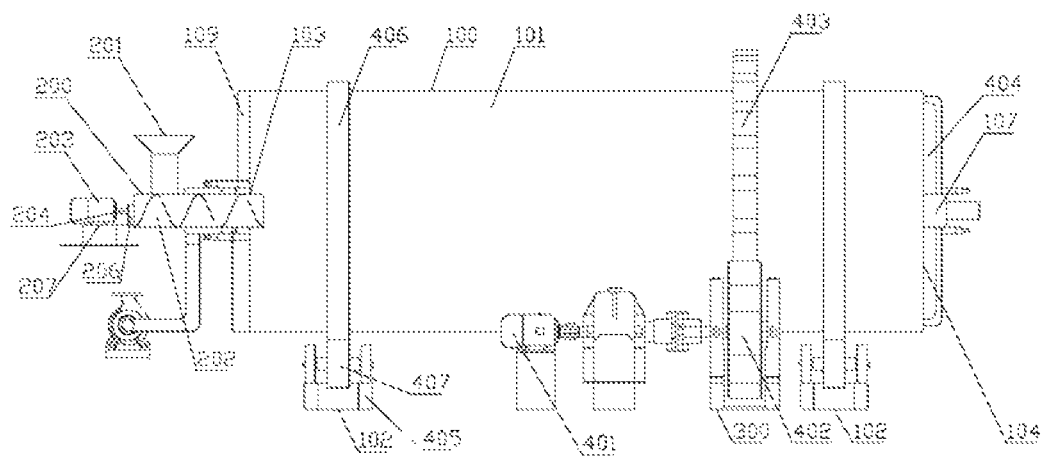
FIG. 1 is a structural diagram of a kitchen waste treatment device of the present invention.

SUMMARY OF REFERENCE NUMERALS main fermentation barrel 100; feeding apparatus 200; power apparatus 300;

barrel body 101; supporting bracket 102; feed inlet 103; discharge outlet 104; material chamber 105; gas inlet 107; gas exhaust port 108; first end cover 109; gas exhaust channel 110; switch 111;

feed bin 201; feed cylinder 202; motor 203; push rod 204; conveying plate 205; supporting holder 206; supporting plate 207;

spiral propulsion operating plate 301; first stirring operating plate 302; second stirring operating plate 303; turning operating plate 304; material guide plate 305;

electric motor 401; drive gear 402; driven gear 403; second end cover 404; base 405; supporting ring 406; roller 407.

DETAILED DESCRIPTION OF EMBODIMENTS

Currently, many restaurants are provided with kitchen waste treatment devices, however, these devices have complicated structures and occupy large areas, which results in inconvenient cleaning and further affect the surrounding environment. Moreover, during working of these treatment devices, a large amount of waste gases escape, and these gases smell bad and affect people's life.

In view of this, designers of the present invention have designed a kitchen waste treatment device, in which push plates are fixedly mounted in a barrel body, the barrel body rotates to drive rotation of the push rod to achieve pushing of materials, requiring no stirring mechanisms, and the fermentation barrel has a simple structure and low production cost. Moreover, proper gas inlet and gas exhaust systems are provided so that waste gases generated during fermentation will not escape from the barrel body, which is safe and environment-friendly.

In order to make the objects, technical solutions and advantages of the examples of the present invention more clear, technical solutions of the examples of the present invention will be described below clearly and fully with reference to the figures of the examples of the present invention. It is apparent that the described examples are some, but not all of the examples of the present invention. Generally, the components of the examples of the present invention, as described and illustrated in the figures herein, may be arranged and designed in a wide variety of different configurations. Thus, the following detailed description of the examples of the present invention, as represented in the figures, is not intended to limit the scope of the present invention as claimed, but is merely representative of selected examples of the present invention. All the other examples obtained by those skilled in the art from the examples of the present invention without inventive efforts will fall within the scope of the present invention.

It should be noted that similar reference numerals and letters refer to similar items in the following figures, and thus once an item is defined in one figure, it may not be further defined or explained in the following figures.

In the description of the present invention, it should be indicated that orientation or positional relations indicated by terms such as "center", "up", "down", "left", "right", "vertical", "horizontal", "inside", and "outside" are based on the orientation or positional relations as shown in the figures, or the orientation or positional relations in which the inventive product is conventionally placed in use, only for facilitating describing the present invention and simplifying the description, rather than indicating or implying that the referred devices or elements must be in a particular orientation or constructed or operated in the particular orientation, and therefore they should not be construed as limiting the present invention. In addition, terms such as "first", "second", and "third" are used only for distinguishability in description, and should not be understood as indicating or implying to have importance in relativity.

In the description of the present invention, it should be also indicated that unless otherwise expressly specified or defined, terms "provided", "mounted", "coupled", and "connected" should be understood broadly, and for example, a connection may be a fixed connection, or a detachable connection, or an integrated connection; may be a mechanical connection or an electric connection; or may be a direct connection, or an indirect connection via an intermediate medium, or may be an internal communication between two elements. The specific meanings of the above-mentioned terms in the present invention could be understood by those skilled in the art according to specific situations.

Figure 2:
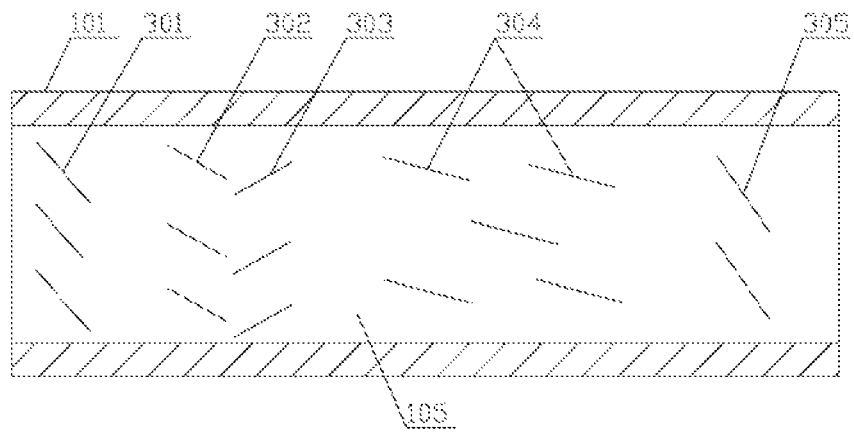
FIG. 2 is a cross-section diagram of a barrel body of the kitchen waste treatment device of the present invention.
Figure 3:
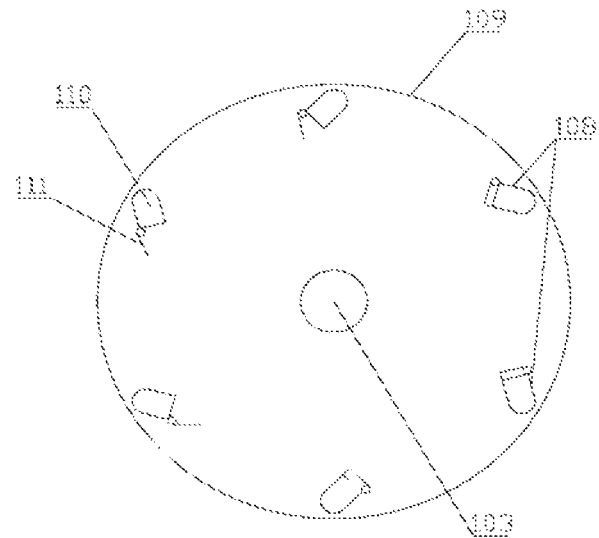
FIG. 3 is a structural diagram of a first end cover of the kitchen waste treatment device of the present invention.
Figure 4:
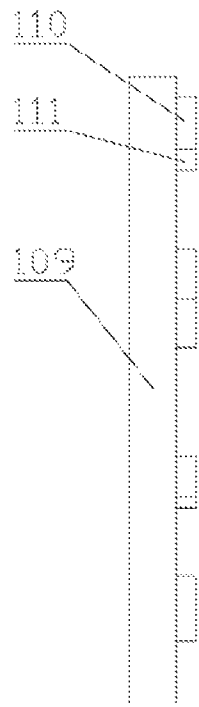
FIG. 4 is a side view corresponding to the first end cover of FIG. 3.
Figure 5:
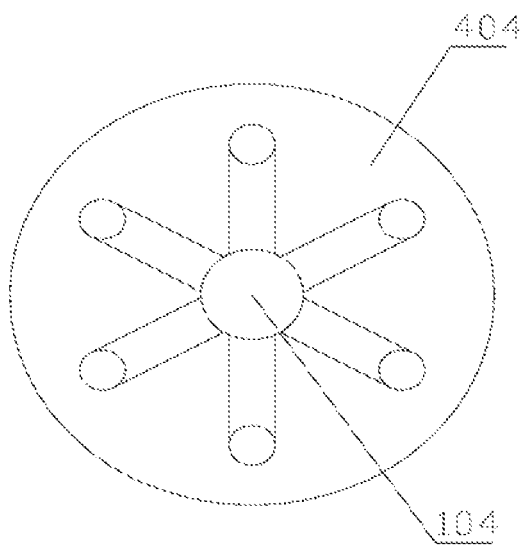
FIG. 5 is a structural diagram of a second end cover of the kitchen waste treatment device of the present invention.
Figure 6:
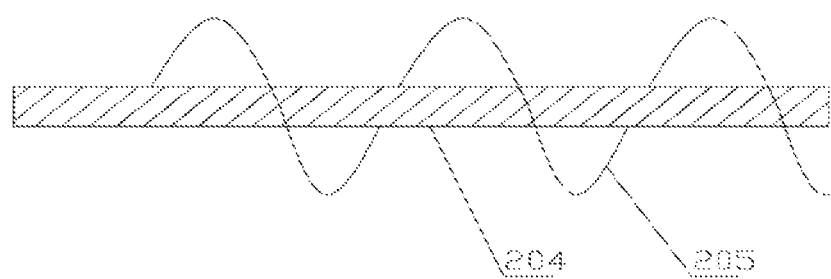
FIG. 6 is a structural diagram of a push rod and a conveying plate of the kitchen waste treatment device of the present invention.

Referring to FIGS. 1-6, the present invention provides a kitchen waste treatment device comprising a main fermentation barrel 100, a feeding apparatus 200, a power apparatus 300, and supporting brackets 102, wherein the main fermentation barrel 100 comprises a barrel body 101, wherein the barrel body 101 is mounted on the supporting brackets 102, the barrel body 101 includes a feed inlet 103, a discharge outlet 104 and a material chamber 105, the feed inlet 103 and the discharge outlet 104 communicate with the material chamber 105, respectively, and a feed end of the feeding apparatus 200 communicates with the feed inlet 103; and the power apparatus 300 is connected to the barrel body 101 in a driving way to drive the barrel body 101 to rotate around its axis;

the main fermentation barrel 100 further comprises a plurality of push plates, wherein the plurality of push plates are located within the material chamber 105 and fixedly connected to the barrel body 101, the plurality of push plates are spaced with a set distance, and when the barrel body 101 rotates, the push plates push materials in the material chamber 105 to move along an axial direction of the barrel body 101;

the main fermentation barrel 100 further comprises a gas inlet system and a gas exhaust system, wherein gas inlets 107 of the gas inlet system and the discharge outlet 104 are located at a same end of the barrel body 101, and the gas inlets 107 communicate with the material chamber 105; and gas exhaust ports 108 of the gas exhaust system and the feed inlet 103 are located at a same end of the barrel body 101, and the gas exhaust ports 108 communicate with the material chamber 105.

The kitchen waste treatment device provided by the present invention carries out horizontal propulsion and repeated rotational stirring of the materials in the barrel body 101 by rotation of the barrel body 101 itself, to achieve the purpose of material degrading and fermenting. Specifically, the barrel body 101 is provided therein with push plates which are fixed in the barrel body 101 at set angles, the barrel body 101 is driven by the power apparatus 300 to rotate around its own axis, and the barrel body 101 drives rotation of the push plates during rotation; and when the push plates rotate, since there are certain angles between plate surfaces of the push plates and a central line of the barrel body 101, the push plates can push the materials from the feed inlet 103 to the discharge outlet 104, and while being pushed, the materials rotate together with the barrel body 101, so that contact between the materials and oxygen gas is more uniform and the degradation of the materials is more complete.

Moreover, it is necessary to introduce a lot of oxygen gas during the degradation of the materials in order to accelerate the degradation process and make the degradation more complete, and the gas inlets 107 of the fermentation barrel are provided at an end of the barrel body 101 where the discharge outlet 104 is located, and after introduction, the gas comes into direct contact with the materials for main fermentation, so that biological bacteria multiply explosively, a large number of biological bacteria degrade the materials quickly into various organic ingredients, generating heat and water. The generated heat further increases the temperature in the main fermentation phase, and at the same time, with the introduction of the gas from the gas inlets 107, the heat also enters the feed inlet 103 along with the gas to heat and wet new materials fed from the feed inlet 103 so as to promote growth of bacteria and provide a better condition for the main fermentation phase. Further, the gas exhaust ports 108 are provided at an end of the barrel body 101 where the feed inlet 103 is located, facilitating collecting waste gases generated during the fermentation and avoiding air pollution due to leakage of the waste gases.

In a preferred solution of the example, the feeding apparatus 200 comprises a feed bin 201, a feed cylinder 202, a motor 203 and a push rod 204, wherein the feed bin 201 communicates with the feed cylinder 202, the feed cylinder 202 is rotationally connected with the first end cover 109, and an axis of the feed cylinder 202 is collinear with the axis around which the barrel body 101 rotates; the push rod 204 is provided thereon with a conveying plate 205, the conveying plate 205 extends spirally along an axial direction of the push rod 204 and the conveying plate 205 is located within the feed cylinder 202; and an output end of the motor 203 is connected to the push rod 204 in a driving way, and the feed end is located at an end of the feed cylinder 202. The materials are put in from the feed bin 201, automatic conveying of the materials is achieved by the action of the push rod 204, the operation is more flexible and time and labor are saved. Moreover, the amount of the material conveyed is more uniform, facilitating fermentation of the materials in the barrel body 101.

While the push rod 204 is in a material conveying process, the push rod 204 suffers certain resistance. In order to ensure safer use of the push rod 204 and increase the service life of the push rod 204, it is preferable that the feeding apparatus 200 further comprises a supporting plate 207 and a supporting holder 206, wherein the supporting plate 207 is fixedly connected with the feed cylinder 202, and the motor 203 is mounted on the supporting plate 207; and the supporting holder 206 is located between the motor 203 and the feed cylinder 202, the supporting holder 206 is mounted on the supporting plate 207, and the push rod 204 penetrates through the supporting holder 206 and is rotationally connected to the supporting holder 206.

In a preferred solution of the example, the material chamber 105 comprises an inoculation and heating segment, a main fermentation segment, and a decomposition segment provided sequentially along a direction from the feed inlet 103 to the discharge outlet 104;

the push plates comprises a plurality of spiral propulsion operating plates 301, a plurality of stirring operating plates, a plurality of turning operating plates 304 and a plurality of material guide plates 305, wherein the plurality of spiral propulsion operating plates 301 are located at an end of the barrel body 101, where the feed inlet 103 is located, and configured to push the materials to the inoculation and heating segment; and after entering the material chamber 105, kitchen wastes firstly enter an inoculation and heating phase under the action of the spiral propulsion operating plates 301, and in the inoculation and heating phase, are stirred by the stirring operating plates, so that biological bacteria are distributed more uniformly in the materials to accelerate multiplication of the biological bacteria and provide a better condition for the subsequent fermentation process.

The plurality of stirring operating plates are located at the inoculation and heating segment and configured to stir the materials and push the materials to the main fermentation segment; and after the materials enter the main fermentation segment, since a lot of oxygen gas introduced from the gas inlets 107 enters the main fermentation segment to come into contact with the biological bacteria in the main fermentation segment, so that the biological bacteria multiply explosively, a large number of biological bacteria degrade the wastes into various organic ingredients quickly, generating heat and water. Part of the generated heat allows further heating, and the rest part of the heat is transferred systematically to new materials located at the inoculation and heating segment for heating. The generated water is discharged together with waste gases out of the fermentation barrel from the gas exhaust ports 108.

The plurality of turning operating plates 304 are located at the main fermentation segment and configured to turn the materials and convey the materials to the decomposition segment; the turning operating plates 304 perform a turning treatment on the materials in the main fermentation segment to accelerate the degradation process and to make degradation of the materials more complete; and at the same time, the materials which have been fermented at the main fermentation segment are pushed to the decomposition segment by the action of the turning operating plates 304, organic substances in the materials are substantially degraded, and the biological bacteria are massively dead and cooled due to the absence of nutrients.

Since a large amount of heat generated during the fermentation is effectively utilized, the resource is saved, and compared to the main fermentation phase in the prior art which relies on continuous heating, stirring, drying and partial carbonization, the utilization rate of energy is high, energy distribution is more reasonable and there is no need to consume a large amount of power. In the prior art fermentation method, energy consumption for 1 ton of kitchen waste exceeds over 500 kWh power, which is high, resulting in high treatment cost, thus having no use value and being unable to be widely used, whereas the fermentation device of the present invention makes comprehensive use of heat generated by biological aerobic fermentation per se without using heating apparatuses, has an energy consumption of 30 kWh/ton, and saves 95% or more of energy.

The plurality of material guide plates 305 are located at the decomposition segment and configured to push the materials to the discharge outlet 104, facilitating pushing the materials out.

In a preferred solution of the above-mentioned embodiment, the stirring operating plates comprise first stirring operating plates 302 and second stirring operating plates 303, wherein the first stirring operating plates 302 are located between the spiral propulsion operating plates 301 and the second stirring operating plates, directions in which the first stirring operating plates 302 and the second stirring operating plates 303 are inclined are opposite, and the second stirring operating plates 303 are configured to push the materials along a direction from the discharge outlet 104 to the feed inlet 103. The stirring operating plates can push the materials fed from the feed inlet 103 to the main fermentation segment, and also the second stirring operating plates 303 can push the materials located at the main fermentation segment to the inoculation and heating segment during rotation, to achieve mixing. The materials pushed back from the main fermentation segment carry a lot of biological bacteria, and after mixing, the materials in the inoculation and heating segment contain more biological bacteria, which is beneficial to the fermentation in the inoculation and heating segment, and the materials in the inoculation and heating segment having an increased density of biological bacteria will have a better fermentation effect after entering the main fermentation segment.

As a preferred solution of the example, in order to facilitate gas circulation in the material chamber 105, the main fermentation barrel 100 further comprises a second end cover 404, wherein the gas inlets 107 of the gas inlet system are located on the second end cover 404; and the gas inlet system comprises a plurality of gas inlets 107, wherein the plurality of gas inlets 107 are distributed uniformly along a circumferential direction of the second end cover 404, the plurality of gas inlets 107 are in communication through gas inlet tubes, and the gas inlet tubes communicate with a gas inlet end of a blower. By introducing gas through the blower, the gas is circulated more smoothly, and the heat is transferred more effectively, which is helpful to the fermentation. Moreover, a plurality of gas inlets 107 are provided, and due to that the barrel body 101 rotates to drive the materials to rotationally move together, when the gas is introduced, contact between the gas and the biological bacteria is more uniform and the contact area is larger, which is helpful to the fermentation.

In a preferred solution of the example, for facilitating provision of the gas exhaust system and discharge of waste gases, the main fermentation barrel 100 comprises a first end cover 109, wherein the first end cover 109 is mounted to cover a barrel opening of the barrel body 101, and both the gas exhaust ports 108 of the gas exhaust system and the feed inlet 103 of the barrel body 101 are located on the first end cover 109. The gas exhaust ports 108 are machined in the first end cover 109, wherein the machining of the gas exhaust ports 108 is convenient; and then the first end cover 109 is mounted to cover the barrel opening of the barrel body 101, wherein the mounting is convenient.

In a preferred solution of the above-mentioned embodiment, the gas exhaust system comprises a plurality of gas exhaust ports 108, wherein the gas exhaust ports 108 are provided uniformly along a circumferential surface of the first end cover 109;

the gas exhaust port 108 comprises a gas exhaust channel 110 and a switch 111 controlling opening or closing of the gas exhaust channel 110, wherein the gas exhaust channel 110 is provided on the first end cover 109, the switch 111 is connected to the gas exhaust channel 110 in manner of rotation on a rotation axis, the rotation axis extends along the axial direction of the barrel body 101, and the switch 111 rotates around the rotation axis, switching between an open state and a closed state. The materials are rotated in the barrel body 101 and are not stacked massively at a high place of the barrel body 101 due to the action of gravity of the materials, a large quantity of the materials are stacked at a bottom position of the barrel body 101, the first end cover 109 rotates together with the barrel body 101, and when the gas exhaust ports 108 are rotated to the bottom position of the barrel body 101, the switches 111 are closed by the action of gravity, and the materials do not enter the gas exhaust channels 110, and at this time, the switches 111 located at a high place are opened also by the action of gravity, so that the gas exhaust channels 110 discharges the gases smoothly. When the switches 111 are rotated to the bottom position, some of the materials may adhere to external surfaces of the switches 111, and when the switches 111 are rotated with the barrel body 101, the switches 111 are opened by the action of gravity so that the materials fall off, ensuring the safe use of the gas exhaust system.

The number of the gas exhaust ports 108 is designed according to the situation, and in order to ensure the gas discharge effect, at least three of the switches 111 are ensured to be opened during the rotation of the barrel body 101.

Further, after the waste gases are discharged from the gas exhaust system, the waste gases are collected and purified by a purification apparatus, and the purified waste gases can be discharged into the air without polluting the environment; and there are many prior apparatuses for purifying waste gases, which are thus not described in detail here.

Obviously, the first end cover 109 also may be rotationally connected to the barrel body 101, that is to say, when the barrel body 101 rotates, the first end cover 109 does not rotate with the barrel body 101, and at this time, the gas exhaust ports 108 are provided at positions of the first end cover 109 close to the top of the barrel body 101 and can be designed directly as through holes without designing structures such as the switches 111, thus the structure is simple and machining is convenient.

There are many structures for achieving the rotation of the barrel body 101 and, in a preferred solution of the example, the power apparatus 300 comprises an electric motor 401 and a gear transmission assembly, wherein the gear transmission assembly includes a drive gear 402 and a driven gear 403 engaging each other, an output shaft of the electric motor 401 is connected to the drive gear 402 in a driving way, and the driven gear 403 is sheathed on an external wall of the barrel body 101 and fixedly connected to the barrel body 101. The gears have a stable and reliable transmission mode, have a firm structure, and can be used safely. Moreover, the power apparatus 300 can be provided with a controller which is electrically connected with the electric motor 401 to control a rotational speed of the barrel body 101.

In a preferred solution of the example, for further strengthening the structural strength of the barrel body 101, the supporting bracket 102 comprises a base 405 and a supporting ring 406, wherein the supporting ring 406 is sheathed on the external wall of the barrel body 101 and fixedly connected to the barrel body 101; and the supporting ring 406 and the base 405 are connected by a roller 407 therebetween. When the barrel body 101 rotates, the roller 407 can reduce a friction force so that the whole device operates more steadily, abrasion between the supporting ring 406 and the base 405 is small, enabling a long service life; and moreover, replacement of the roller 407 is convenient, enabling a low cost.

In a preferred solution of the example, the fermentation barrel further comprises a temperature measurement apparatus, and the barrel body is provided with a temperature measurement hole in which a detection head of the temperature measure apparatus is mounted. It is convenient to monitor a change of the temperature during the fermentation to control the fermentation process in real time and achieve better fermentation.

APPLICATION EXAMPLE

Taking a device treating 2 tons of kitchen wastes (wet wastes) per day as an example, 2 tons of kitchen wastes (wet wastes) are dehydrated to about 0.8 ton, that is to say, 0.8 ton of material is fed per day, and 10 days later, the materials fed on the first day, after undergoing main fermentation for decomposition and water loss, are rotated and propelled to become about 0.35 ton of organic fertilizer and arrive at the position of the discharge outlet. That is, a production line is formed where 0.8 ton of material is fed per day, 0.35 ton of material is discharged per day, about 10 days form one cycle, the cycle is repeated, which is similar to metabolism. The main fermentation barrel is set to rotate (clockwise or anticlockwise) twice per day, with each rotation lasting about 1 hour, wherein 10 days, from feeding to discharge of the materials, form one cycle period.

This patent is designed so that after the kitchen wastes undergo the main fermentation phase for 7 to 10 days, organic substances have been substantially degraded, and then the kitchen wastes are packed and then stacked and kept for 1 month so that the degraded organic substances are sufficiently decomposed into high-quality organic fertilizers and then subjected to deep processing and selling.

Compared to the prior technology in which kitchen wastes are heated and dried using a high temperature so that partial kitchen wastes are carbonized and thus content of organic fertilizers is very small and the fertilizer efficiency is low, the device of the present invention perfectly achieves a composting process of kitchen wastes and can transform a large amount of the kitchen wastes into high-quality organic fertilizers to greatly improve the fertilizer efficiency.

The above are merely preferred examples of the present invention and are not intended to limit the present invention. It would be understood by those skilled in the art that various modifications and variations can be made to the present invention. Any modifications, equivalent alternatives, improvements and so on made within the spirit and principle of the present invention should be included in the scope of protection of the present invention.

The invention claimed is:

1. A kitchen waste treatment device, comprising a main fermentation barrel, a feeding apparatus, a power apparatus, and supporting brackets,
    wherein the main fermentation barrel comprises a barrel body, the barrel body is mounted on the supporting brackets, the barrel body comprises a feed inlet, a discharge outlet and a material chamber, the feed inlet and the discharge outlet communicate with the material chamber, respectively, and a feed end of the feeding apparatus communicates with the feed inlet; and the power apparatus is connected to the barrel body in a driving way to drive the barrel body to rotate around its axis;
    the main fermentation barrel further comprises a plurality of push plates, the plurality of push plates are located within the material chamber and fixedly connected to the barrel body, the plurality of push plates are spaced with a set distance, and when the barrel body rotates, the push plates push materials in the material chamber to move along an axial direction of the barrel body;
    the main fermentation barrel further comprises a gas inlet system and a gas exhaust system, the gas inlet system comprising a plurality of gas inlets, the gas exhaust system comprising a plurality of gas exhaust ports, wherein the gas inlets of the gas inlet system and the discharge outlet are located at a same end of the barrel body, and the gas inlets communicate with the material chamber; and wherein the gas exhaust ports of the gas exhaust system and the feed inlet are located at a same end of the barrel body, and the gas exhaust ports communicate with the material chamber,
    wherein the main fermentation barrel comprises a first end cover, the first end cover is mounted to cover a barrel opening of the barrel body, wherein the first end cover is configured to rotate in response to rotation of the barrel body, and wherein both the gas exhaust ports of the gas exhaust system and the feed inlet of the barrel body are located on the first end cover;
    wherein the feeding apparatus comprises a supporting plate and a supporting holder, and wherein the power apparatus comprises an electric motor and a gear transmission assembly;
    wherein the plurality of gas exhaust ports are provided uniformly along a circumferential surface of the first end cover; and
    wherein each gas exhaust port comprises a gas exhaust channel and a switch, wherein the switch of each gas exhaust port is rotationally connected to the gas exhaust channel of the gas exhaust port such that the switch is configured for rotation between an open state that exposes an opening to the gas exhaust channel and a closed state that closes the opening to the gas exhaust channel, and wherein the switch of each gas exhaust port is configured for rotation about a rotation axis that extends along the axial direction of the barrel body, wherein the switch of each gas exhaust port is configured for rotation to the open state by action of gravity as the first end cover rotates in response to rotation of the barrel body.

2. The kitchen waste treatment device according to claim 1, wherein the feeding apparatus comprises a feed bin, a feed cylinder, a motor and a push rod, the feed bin communicates with the feed cylinder, the feed cylinder is rotationally connected with the first end cover, and an axis of the feed cylinder is collinear with the axis around which the barrel body rotates; the push rod is provided thereon with a conveying plate, the conveying plate extends spirally along an axial direction of the push rod, and the conveying plate is located within the feed cylinder; and an output end of the motor is connected to the push rod in a driving way, and the feed end is located at an end of the feed cylinder.

3. The kitchen waste treatment device according to claim 2, wherein the material chamber comprises an inoculation and heating segment, a main fermentation segment, and a decomposition segment provided sequentially along a direction from the feed inlet to the discharge outlet;
    the push plate comprises a plurality of spiral propulsion operating plates, a plurality of stirring operating plates, a plurality of turning operating plates and a plurality of material guide plates,
    wherein the plurality of spiral propulsion operating plates are located at an end of the barrel body, where the feed inlet is located, and configured to push the materials to the inoculation and heating segment;
    the plurality of stirring operating plates are located at the inoculation and heating segment and configured to stir the materials and push the materials to the main fermentation segment;
    the plurality of turning operating plates are located at the main fermentation segment and configured to turn the materials and convey the materials to the decomposition segment; and
    the plurality of material guide plates are located at the decomposition segment and configured to push the materials to the discharge outlet.

4. The kitchen waste treatment device according to claim 3, wherein the stirring operating plates comprise first stirring operating plates and second stirring operating plates, the first stirring operating plates are located between the spiral propulsion operating plates and the second stirring operating plates, directions in which the first stirring operating plates and the second stirring operating plates are inclined are opposite, and the second stirring operating plates are configured to push the materials along a direction from the discharge outlet to the feed inlet.

5. The kitchen waste treatment device according to claim 2, wherein the supporting plate is fixedly connected with the feed cylinder, and the motor is mounted on the supporting plate; and the supporting holder is located between the motor and the feed cylinder, the supporting holder is mounted on the supporting plate, and the push rod penetrates through the supporting holder and is rotationally connected to the supporting holder.

6. The kitchen waste treatment device according to claim 5, wherein the material chamber comprises an inoculation and heating segment, a main fermentation segment, and a decomposition segment provided sequentially along a direction from the feed inlet to the discharge outlet;
the push plate comprises a plurality of spiral propulsion operating plates, a plurality of stirring operating plates, a plurality of turning operating plates and a plurality of material guide plates,
wherein the plurality of spiral propulsion operating plates are located at an end of the barrel body, where the feed inlet is located, and configured to push the materials to the inoculation and heating segment;
the plurality of stirring operating plates are located at the inoculation and heating segment and configured to stir the materials and push the materials to the main fermentation segment;
the plurality of turning operating plates are located at the main fermentation segment and configured to turn the materials and convey the materials to the decomposition segment; and
the plurality of material guide plates are located at the decomposition segment and configured to push the materials to the discharge outlet.

7. The kitchen waste treatment device according to claim 6, wherein the stirring operating plates comprise first stirring operating plates and second stirring operating plates, the first stirring operating plates are located between the spiral propulsion operating plates and the second stirring operating plates, directions in which the first stirring operating plates and the second stirring operating plates are inclined are opposite, and the second stirring operating plates are configured to push the materials along a direction from the discharge outlet to the feed inlet.

8. The kitchen waste treatment device according to claim 1, wherein the material chamber comprises an inoculation and heating segment, a main fermentation segment, and a decomposition segment provided sequentially along a direction from the feed inlet to the discharge outlet;
the push plate comprises a plurality of spiral propulsion operating plates, a plurality of stirring operating plates, a plurality of turning operating plates and a plurality of material guide plates,
wherein the plurality of spiral propulsion operating plates are located at an end of the barrel body, where the feed inlet is located, and configured to push the materials to the inoculation and heating segment;
the plurality of stirring operating plates are located at the inoculation and heating segment and configured to stir the materials and push the materials to the main fermentation segment;
the plurality of turning operating plates are located at the main fermentation segment and configured to turn the materials and convey the materials to the decomposition segment; and
the plurality of material guide plates are located at the decomposition segment and configured to push the materials to the discharge outlet.

9. The kitchen waste treatment device according to claim 8, wherein the stirring operating plates comprise first stirring operating plates and second stirring operating plates, the first stirring operating plates are located between the spiral propulsion operating plates and the second stirring operating plates, directions in which the first stirring operating plates and the second stirring operating plates are inclined are opposite, and the second stirring operating plates are configured to push the materials along a direction from the discharge outlet to the feed inlet.

10. The kitchen waste treatment device according to claim 8, wherein the gear transmission assembly comprises a drive gear and a driven gear engaging each other, an output shaft of the electric motor is connected to the drive gear in a driving way, and the driven gear is sheathed on an external wall of the barrel body and fixedly connected to the barrel body.

11. The kitchen waste treatment device according to claim 8, wherein the main fermentation barrel further comprises a second end cover, and the gas inlets of the gas inlet system are located on the second end cover; and
the gas inlet system comprises a plurality of gas inlets, the plurality of gas inlets are distributed uniformly along a circumferential direction of the second end cover, the plurality of gas inlets are in communication through gas inlet tubes, and the gas inlet tubes communicate with a gas inlet end of a blower.

12. The kitchen waste treatment device according to claim 8, wherein the supporting bracket comprises a base and a supporting ring, the supporting ring is sheathed on an external wall of the barrel body and fixedly connected to the barrel body; and the supporting ring and the base are connected by a roller therebetween.

* * * * *